April 13, 1971  K. F. WEINKE  3,574,642
PACKAGE FOR AND METHOD OF PACKAGING MEATS
Original Filed Oct. 21, 1965  2 Sheets-Sheet 1

INVENTOR.
KARL FREDERICK WEINKE
BY Robert P. Auber
ATTORNEY

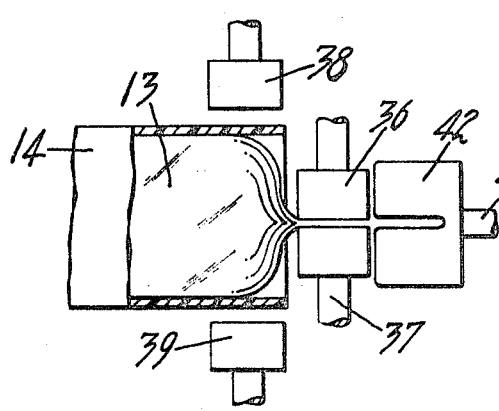
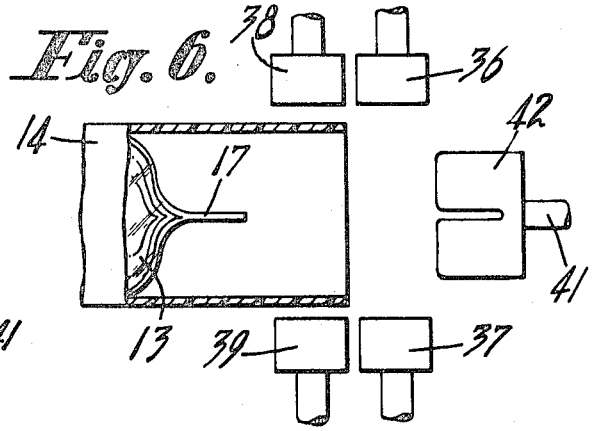
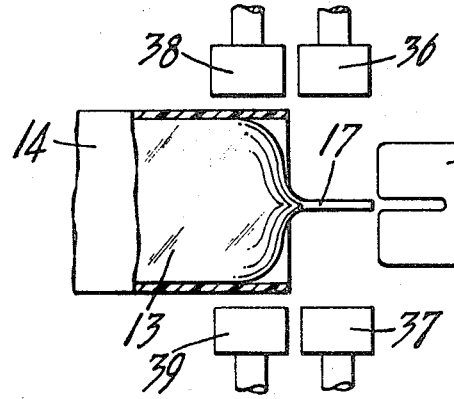
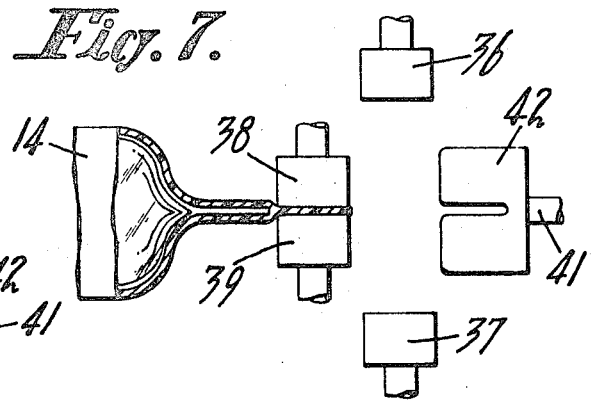
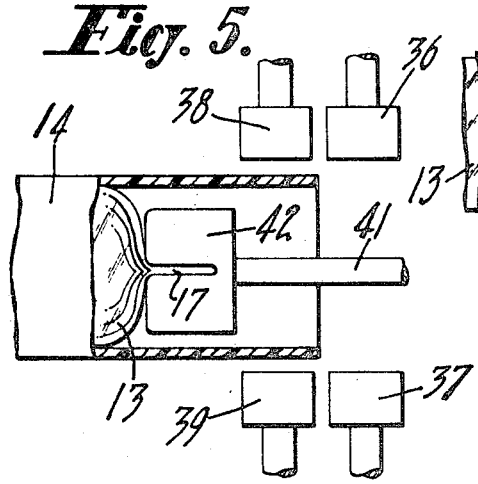
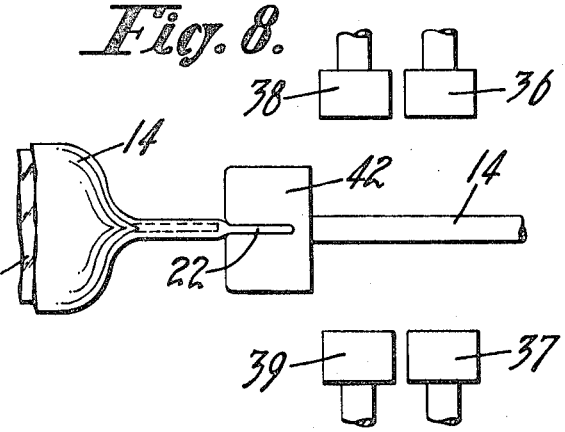

United States Patent Office 3,574,642
Patented Apr. 13, 1971

3,574,642
PACKAGE FOR AND METHOD OF
PACKAGING MEATS
Karl Frederick Weinke, Neenah, Wis., assignor to
American Can Company, New York, N.Y.
Continuation of application Ser. No. 499,811, Oct. 21,
1965. This application May 15, 1969, Ser. No. 826,087
Int. Cl. B65b 25/06, 31/00
U.S. Cl. 99—174
9 Claims

ABSTRACT OF THE DISCLOSURE

A package for and a method of packaging meats are disclosed wherein the package includes an inner oxygen-permeable member which may be either gas flushed or evacuated and an outer oxygen-impermeable member which may also be gas flushed or evacuated. The package preserves the freshness of the meat until the meat is ready to be marketed to the consumer. For marketing, the outer wrapper is removed and the inner package is displayed to the consumer. Being oxygen-permeable, the inner wrapper admits oxygen to the interior of the package causing the fresh meat product to change to a bright red color which the consumer associated with freshness.

---

This application is a continuation of application Ser. No. 499,811, filed Oct. 21, 1965 and now abandoned.

This invention relates to the packaging of food, and more particularly to the packaging of raw meat to preserve its freshness and also to preserve, for relatively long periods, the red color of the meat, which the consumer associates with freshness.

It is well known that fresh meat quality can be maintained longer under anaerobic conditions than aerobic. Such fresh meat has a purple-red color which relatively few ultimate consumers would associated with freshness. However, this color quickly changes to the generally acceptable bright red color when the fresh meat is oxygenated by exposure to air which changes myoglobins in the meat to oxymyoglobins. This change is usually referred to as "blooming."

It is therefore an object of the present invention, including a meat package and a method by which the meat is packaged, to assure preservation of the meat by minimizing its exposure to atmospheric oxygen after the meat is cut, and to permit the meat to bloom to its full red color just prior to placement for display and sale to the retail customer.

An object of the invention is the provision of a package which maintains freshly cut meat under substantial anaerobic conditions.

Other objects of the invention will become apparent from the following description which, together with the drawings, discloses a preferred embodiment of the invention.

Referring to the drawings:

FIGS. 3 through 8 are schematic views showing positions of parts of the packing unit of FIG. 2, during steps of the method.

Figure 1:
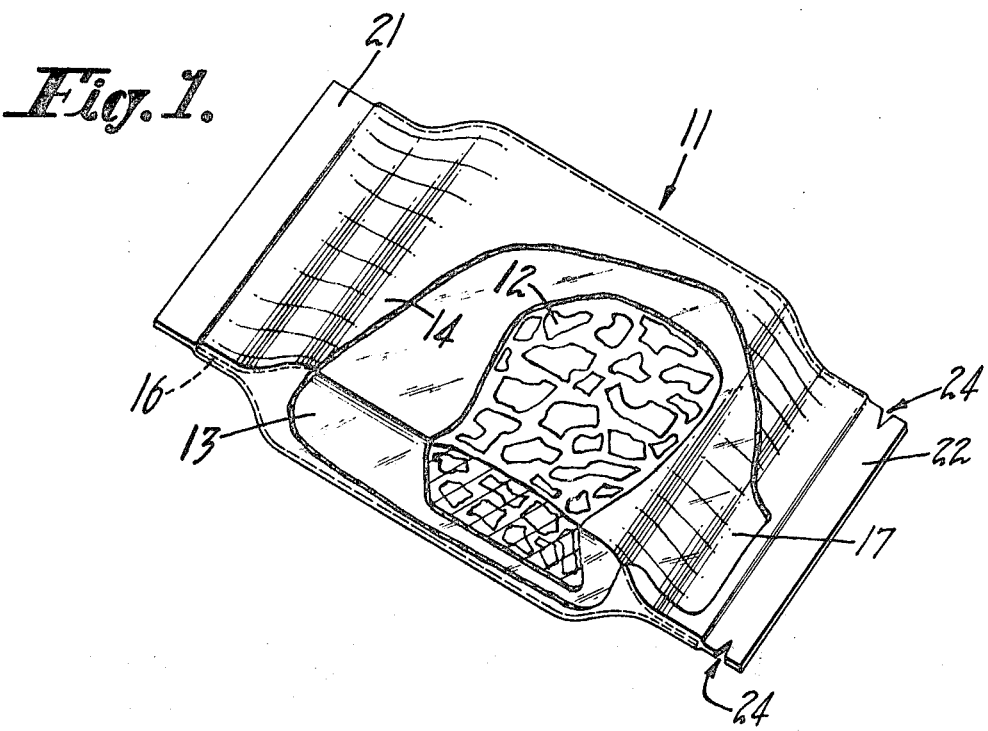
FIG. 1 is a perspective view of the package of the invention.

As a preferred or exemplary embodiment of the instant invention, the package 11 shown in FIG. 1, comprises raw meat 12 disposed within an inner sealed container or pouch 13 which is enclosed by another or outer sealed container or pouch 14.

While the containers 13 and 14 may obviously take any of a wide variety of shapes and forms, they are here shown in the preferred form, as pouches.

Pouch 13 is of highly oxygen-permeable material, such as a film of polyethylene, polypropylene, polyvinyl chloride, metallic salts of carboxylated polyethylene, ethylene-vinyl acetate copolymer, rubber hydrochloride, cellulose acetate, cellulose nitrate, polystyrene and polyurethanes, which exhibit an oxygen permeation rate in excess of about 2,000 milliliters of oxygen per square meter per 24 hours and preferably in excess of 4,000 milliliters of oxygen per square meter per 24 hours. The material is also light weight, flexible and transparent.

An end or bottom 16 and a filling end 17 of the pouch 13 are closed and, preferably, heat and/or pressure sealed. The meat 12 is, of course, placed in the pouch before the filling end is sealed.

Pouch 14 is of highly oxygen-impermeable material such as regenerated cellulose bearing a surface coating of a polymer such as Saran (polyvinylidine chloride or a similar polymer modified by a copolymerization with small amounts of acrylonitrile or polyvinyl chloride), Saran coated polyesters, polyolefins, polyamides and polycarbonates and certain uncoated polyamide, polyester and polyvinyl alcohol films which exhibit an oxygen permeation rate of less than about 40 milliliters of oxygen per square meter per 24 hours and preferably less than 10 milliliters of oxygen per square meter per 24 hours.

There, too, the material is relatively light weight and flexible. The bottom 21 and filling end 22 of pouch 14 are closed and preferably heat and/or pressure sealed. The pouch 13 and its contents are, of course, inserted in pouch 14 before the filling end of the latter is sealed.

Before the pouches 13 and 14 are sealed at their filling ends, the interiors of both pouches and the meat to be packed therein are subjected to vacuum and gassing treatment, and they are sealed during such treatment so that the meat is retained within the package in a substantially anaerobic atmosphere. As shown, the pouches are preferably sealed separately. However, simultaneous sealing of both pouches during treatment is an obvious alternative.

The pouches 13 and 14 are made from material which is light weight and flexible. If the package is subject to a final vacuum treatment prior to sealing then the package will conform closely to the surface of the meat therein.

The outer pouch may be provided with a quick-opening device, such as one or more notches 24 which facilitate opening of the pouch by tearing when the tear is begun at a notch.

The process of treating and closing the package 11 may be effected by steps illustrated in FIGS. 2 through 8 of the drawings.

Figure 2:
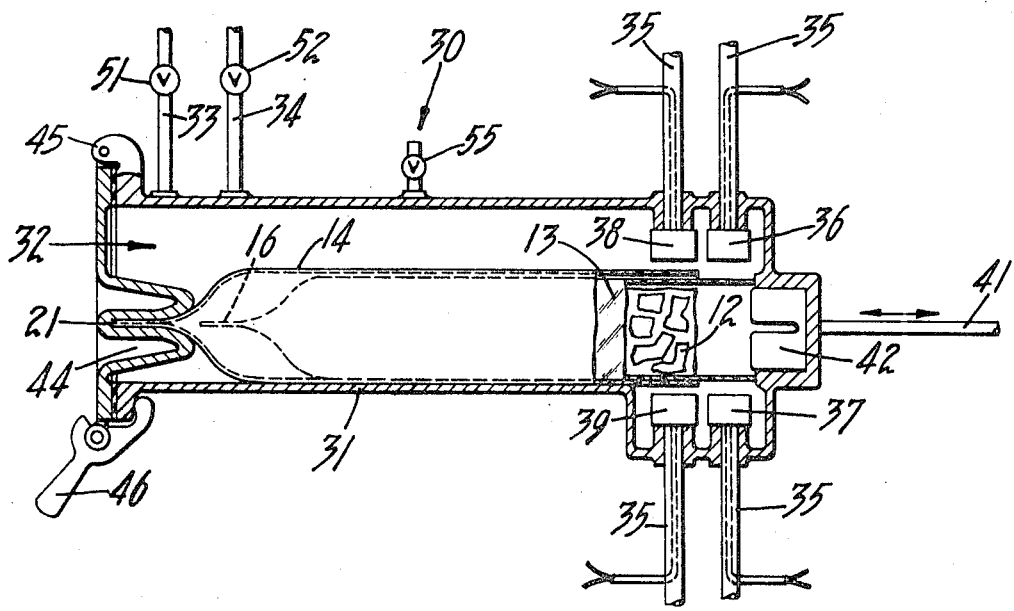
FIG. 2 is a sectional view through a schematic arrangement of a packing unit whereby the steps of the method may be illustrated.

In FIG. 2, a packing unit 30 comprises a housing 31 for a hermetically sealable packing chamber 32 into which lead an evacuation conduit 33 and a gas conduit 34. Also mounted in the housing for vertical reciprocation are four sleeves 35, each fixed at one end to one of the inner seal plungers 36, 37 and outer seal plungers 38, 39. A pusher rod 41, mounted for horizontal reciprocation in the right end (FIG. 2) of the housing, carried at its inner end a pusher head 42 and at the left end of the housing a chamber door 44 is hingedly mounted at 45. This door may be readily opened or locked in closed and sealed position by manipulation of a handle 46.

With the chamber door 44 open, the partially assembled package is inserted in the chamber 32, the meat 12 within the pouch 13 and the pouch 13 projecting beyond the open end of pouch 14, as shown in FIG. 2. Door 44 is then closed and sealed and the open package is vacuumized and gas treated, dependent upon the kind of meat being packed and its cut or comminuted state.

Vacuumizing is effected by opening a valve 51 in conduit 33 so that a vacuum pump or other suitable means may, through the conduit, create a partial vacuum within the chamber and the open package therein. After a suitable lapse of time, the package is sealed under the partial vacuum; or, if flushing with an inert gas, such as nitrogen, is desired, valve 52 is then opened and the gas, from a suitable source, is drawn through conduit 34 into chamber 32 and into the open package therein by the partial vacuum in the chamber.

The procedure may be repeated, if desired, and may terminate with a vacuumizing or a gassing treatment.

When treatment has terminated, plungers 36, 37 which may be electrically heated, are reciprocated to heat seal the pouch as shown in FIG. 3. The plungers are then withdrawn (FIG. 4) and pusher head 42 is moved inwardly to push pouch 13 well into pouch 14 (FIG. 5). Plungers 38, 39 are then aligned with the edges of the open filling end of the outer pouch 14 (FIG. 6), and these plungers, which may also be heated, are moved into sealing engagement with the edges of the filling end to seal the outer pouch (FIG. 7). The sealing plungers are then withdrawn and, if the chamber is under partial vacuum, a vent valve 55 is opened to reestablish atmospheric pressure in the chamber and the door 44 is opened. Pusher head 42 is then moved to the left (FIG. 8) to eject the sealed double-pouch package and its contents.

The package is then stored under refrigeration and just before it is put on display for viewing by prospective retail customers, an attendant at the retail store opens the outer pouch 14, and removes the inner, transparent and oxygen permeable pouch 13. Oxygen quickly enters the sealed but permeable pouch and the meat therein changes in color from its fresh purple-red to a bright red which the customer more readily associates with fresh meat, thus enhancing probability of its sale.

In a specific example of the efficacy of the invention in preserving the color and flavor of red meat for extended periods of time, a series of 14 eight ounce portions of freshly ground beef were packaged in inner pouches of 1 mil thick polyethylene film and outer pouches of cellophane film having an outer coating of Saran and an inner coating of 2 mil thick polyethylene and stored for periods ranging from 3 to 11 days at a temperature of 33° F.

In preparing the sample packages, the meat portion, which was bright red in color and freshly ground, was placed in the inner pouch from which the air was then removed in a vacuum of 28 inches of mercury and the pouch then sealed. The sealed inner pouch was then enclosed in the outer pouch which was evacuated, backflushed with nitrogen and sealed. Control samples of meat were packaged in cellophane coated on the outside with a nitrocellulose coating as is standard present commercial practice. The control packages were not evacuated. Residual oxygen content of each of the test sample packages was found to be between 0.1% and 0.3% as measured in the outer pouch. The color of all packages immediately after sealing was a bright red. After 24 hours all test packages had reverted to a deep purple red color, while the control samples remained red in color.

After three days of storage at 33° F., all test packages were found to contain between 0 and 0.1% residual oxygen in the outer pouch and retained this oxygen level as well as the deep purple red color throughout the remainder of the test.

The control samples, after three days, were brownish in color and badly off taste. On each of the third, fourth, fifth, sixth, seventh and tenth day of the test, one test package was opened, the meat was cooked and taste tested against blind control samples of fresh ground beef. There was no detectable difference in taste through the seventh day, but after ten days of storage there was a definite off-flavor, so the test was stoppped at this point.

On each one of the days on which a package was opened, the outer pouch was first removed and the inner pouch with the meat therein was allowed to remain unopened for a period of time. In each case, the meat within the pouch bloomed quickly to a bright red color, the color reversion being complete within 15 to 30 minutes.

Similar results were obtained in equivalent tests using inner and outer pouches selected from those hereinbefore listed as satisfactory for these respective uses. In general, the best results are obtained when the outer pouch is as low as possible in oxygen permeability and the oxygen permeability of the inner pouch exceeds about 4,000 ml. of $O_2M^2/24$ hrs.

It is thought that the invention and many of its attendant advantages will be understood from the foregoing description and it will be apparent that various changes may be made in the form, construction and arrangement of the parts of the article and that changes may be made in the steps of the method described and their order of accomplishment without departing from the spirit and scope of the invention or sacrificing all of its material advantages, the form hereinbefore described being merely a preferred embodiment thereof. For example, the inner pouch may be filled, evacuated and sealed before its insertion into the outer pouch which outer pouch is then evacuated and sealed. Obviously, in this example, the sealed inner pouch must be enclosed and sealed within the outer pouch under time and/or ambient conditions which maintain its substantially oxygen-free interior.

I claim:

1. A meat package for maintaining the fresh cut color of fresh raw meat and for providing controlled blooming of raw meat when placed on display, comprising: raw meat; a sealed first container for enclosing the raw meat, the first container comprising a closed pouch of transparent, highly oxygen permeable material having an oxygen permeation rate in excess of about two thousand milliliters of oxygen per square meter per twenty-four hours; and a sealed second container of highly oxygen impermeable material, having an oxygen permeation rate of less than about forty milliliters of oxygen per square meter per twenty-four hours, enclosing the first container, the interior of both the first and second containers being under anaerobic conditions to maintain the fresh cut color of the raw meat, the package thereby being adapted for selective removal of the second container to display the first container so that the raw meat may bloom under aerobic conditions.

2. A meat package as defined in claim 1 wherein the interior of both the first and second containers contain an inert gas.

3. A meat package as defined in claim 1 wherein the highly oxygen permeable material is selected from the group consisting of polyethylene, polypropylene polyvinyl chloride, metallic salts of carboxylated polyethylene, ethylene-vinyl acetate copolymer, rubber hydrochloride, cellulose acetate polystyrene and polyurethanes.

4. A meat package as defined in claim 3 wherein the highly oxygen impermeable material is selected from the group consisting of Saran coated cellulose, Saran coated polyesters, polyolefins, polyamides and polycarbonates.

5. A method for preparing a meat package, comprising the steps of:

enclosing fresh raw meat within a first container, having transparent, highly oxygen permeable walls, having an oxygen permeation rate in excess of about two thousand milliliters of oxygen per square meter per twenty-four hours;

enclosing the first container within a second container having highly oxygen impermeable walls, having an oxygen permeation rate of less than about forty milliliters of oxygen per square meter;

evacuating air from the interiors of the first and second containers so that the containers are under substantially anaerobic conditions; sealing the first and second containers to maintain the fresh cut color of the raw meat; and removing the second container from the first container to display the first container to the atmosphere so that the raw meat may bloom under aerobic conditions.

6. A method for preparing a meat package as defined in claim 5 which further includes the step of flushing the interior of the first and second container with an inert gas after evacuation thereof.

7. A method for preparing a meat package as defined in claim 6 wherein the inert gas is nitrogen.

8. A method for preparing a meat package as defined in claim 5 wherein the highly oxygen permeable material is selected from the group consisting of polyethylene, polypropylene, polyvinyl chloride, metallic salts of carboxylated polyethylene, ethylene-vinyl acetate copolymer, rubber hydrochloride, cellulose acetate polystyrene and polyurethanes.

9. A method of preparing a meat package as defined in claim 5 wherein the highly oxygen impermeable material is selected from the group consisting of Saran coated cellulose, Saran coated polyesters, polyolefins, polyamides and polycarbonates.

References Cited

UNITED STATES PATENTS

| | | | |
|---|---|---|---|
| 3,193,392 | 7/1965 | Lundquist et al. | 99—174 |
| 3,330,668 | 7/1967 | Hiscock | 99—189X |

HYMAN LORD, Primary Examiner

U.S. Cl. X.R.

99—189